(12) United States Patent
Agapiou et al.

(10) Patent No.: US 10,023,498 B2
(45) Date of Patent: Jul. 17, 2018

(54) SETTABLE CEMENT COMPOSITIONS FOR TERMINATING WATER FLOW AND ASSOCIATED METHODS

(71) Applicant: HALLIBURTON ENERGY SERVICES, INC., Houston, TX (US)

(72) Inventors: Kyriacos Agapiou, Houston, TX (US); Thomas J. Pisklak, Cypress, TX (US); Larry Eoff, Porter, TX (US)

(73) Assignee: Halliburton Energy Services, Inc, Houston, TX (US)

( * ) Notice: Subject to any disclaimer, the term of this patent is extended or adjusted under 35 U.S.C. 154(b) by 0 days.

(21) Appl. No.: 15/505,268

(22) PCT Filed: Oct. 16, 2014

(86) PCT No.: PCT/US2014/060919
§ 371 (c)(1),
(2) Date: Feb. 21, 2017

(87) PCT Pub. No.: WO2016/060669
PCT Pub. Date: Apr. 21, 2016

(65) Prior Publication Data
US 2017/0247294 A1    Aug. 31, 2017

(51) Int. Cl.
E21B 33/14    (2006.01)
E21B 33/13    (2006.01)
C04B 28/06    (2006.01)
C04B 22/16    (2006.01)
C09K 8/467    (2006.01)
C04B 103/40   (2006.01)
C04B 111/00   (2006.01)

(52) U.S. Cl.
CPC .............. C04B 28/06 (2013.01); C04B 22/16 (2013.01); C09K 8/467 (2013.01); E21B 33/14 (2013.01); C04B 2103/40 (2013.01); C04B 2111/00043 (2013.01); C04B 2111/00991 (2013.01)

(58) Field of Classification Search
CPC ......... E21B 33/14; E21B 33/13; C04B 28/06; C04B 22/16; C09K 8/467
See application file for complete search history.

(56) References Cited

U.S. PATENT DOCUMENTS

| 2,892,728 | A | 6/1959 | Jolly |
| 5,234,497 | A | 8/1993 | Crocker |
| 7,462,234 | B2 * | 12/2008 | Reddy ................. C04B 22/124 |
| | | | 106/692 |
| 2008/0302276 | A1 | 12/2008 | Perez-Pena et al. |
| 2013/0319672 | A1 | 12/2013 | Reddy et al. |

FOREIGN PATENT DOCUMENTS

EP    2457974 A1    5/2012

OTHER PUBLICATIONS

International Search Report and Written Opinion for International Application No. PCT/US2014/060919 dated Jun. 30, 2015. (13 pages).

* cited by examiner

*Primary Examiner* — Catherine Loikith
(74) *Attorney, Agent, or Firm* — Haynes and Boone, LLP

(57) ABSTRACT

Compositions and methods for terminating water flow in a subterranean formation are described. The compositions include a calcium aluminate cement, a Portland cement, a non-aqueous carrier fluid, and a polyphosphate. The cement compositions, upon making contact with water, form a viscous gel that sets into a hardened mass with extraordinary compressive strengths in a short period of time.

20 Claims, No Drawings

SETTABLE CEMENT COMPOSITIONS FOR TERMINATING WATER FLOW AND ASSOCIATED METHODS

BACKGROUND

The present invention relates generally to cementing compositions and slurries that are useful for water control in oil and gas wells, and methods of using them to terminate water flow in subterranean formations.

In the operation of wells used in the recovery of fluids from or the introduction of fluids into subterranean formations, problems relating to the unwanted passage of water from undesirable locations in the formation or well bore sometimes occur. This unwanted passage of water can severely disrupt or in fact terminate the desired operation of a well.

To be more specific, the problems ordinarily involve the movement of water through very small undesirable openings. These problems are not unique, and solutions have traditionally involved apparatus, methods and compositions adapted to cover, seal or to otherwise plug the openings to thereby terminate the unwanted passage of fluid therethrough. The openings include holes or cracks in well casing; spaces such as holes, cracks, voids or channels in the cement sheath deposited in the annular space between the formation face and well casing; very small spaces called microannuli between the cement sheath, and the exterior surface of the well casing or formation; and permeable spaces in gravel packs and formations.

Still another problem involved in the operation of wells revolves around the unwanted movement of water via cracks and fractures in the subterranean formation—whether naturally occurring or deliberately produced—from the formation into the well bore. Terminating this water movement may require remedial efforts other than those referred to above that typically involve plugging perforations, holes, cracks and the like in casing, cement sheath and gravel packs—all of which occur within the confines of the well borehole itself.

Conventional substances used in sealing or plugging the holes or cracks have included diesel oil cements that include an API Class cement, a surface-active agent and diesel oil or kerosene. These diesel oil type cements do not set until they are placed in a water-bearing zone where they absorb water and set. Many of these cements take considerable time to set and develop strength. Thus, there is a need for improved compositions and methods that provide rapid-setting and strong materials in a short period of time.

DETAILED DESCRIPTION

According to several exemplary embodiments, cement compositions and methods are provided for terminating water flow in a subterranean formation. The cement compositions outperform existing products in their ability to more rapidly set and develop strength upon contact with water, as well as reach higher ultimate compressive strengths. The cement compositions can be used in a number of operations where a rapid-setting composition is desirable, and are particularly well suited for conformance applications where it is necessary to mitigate ingress from formation fluids.

According to several exemplary embodiments, the cement compositions, upon making contact with water or an aqueous-based fluid, immediately form a viscous gel, which then sets into a hardened mass to give a final product with extraordinary compressive strengths in a short period of time (e.g., less than 30 minutes). The ability of these compositions to gel upon contact with water or aqueous fluids makes them attractive for selective water shut-off operations.

According to several exemplary embodiments, the cement compositions include a calcium aluminate cement and Portland cement as active components, and a non-aqueous carrier fluid. Calcium aluminate cement (CAC) is a type of hydraulic cement. CAC is also commonly referred to as aluminous cement or high alumina cement. CAC has a high alumina content, about 36-42 weight percent is typical. Higher purity CAC is also commercially available in which the alumina content can range as high as 80 weight percent. These higher purity CAC tends to be very expensive relative to other cements. A suitable CAC is commercially available from Kerneos, Inc. of Chesapeake, Va. under the tradename Secar® 71. The CAC is present in the composition in the range of about 25 to 75 percent by weight of the composition.

Portland cement (PC) is another type of hydraulic cement. PC refers to a cement which contains tricalcium silicate $((CaO)_3SiO_2)$ and dicalcium silicate $((CaO)_2SiO_2)$ in a total amount of at least 50% by weight of the cement. Any type of PC may be used, including an API oil well class PC. An example of a suitable PC is Class H PC, which is commercially available from Texas Lehigh Cement Company of Buda, Tex. The PC is present in the composition in the range of about 0.1 to 10 percent by weight of the composition.

According to several exemplary embodiments, the non-aqueous carrier fluid may be a non-polar hydrocarbon-based fluid. A suitable non-aqueous carrier fluid is diesel oil. Any oil-based fluid or non-aqueous fluid, however, may serve as the carrier for the active components. For example, the non-aqueous carrier fluid may include an aliphatic compound, such as hexane, heptane or octane, an aromatic compound such as benzene, toluene or xylene, and mixtures thereof such as kerosene, diesel oil, mineral oil, and lubricating oil. The non-aqueous carrier fluid is present in the composition in the range of about 25 to 75 percent by weight of the composition.

According to several exemplary embodiments, the cement compositions optionally include a polyphosphate and surfactant or surfactant package. In one embodiment, sodium hexametaphosphate (SHMP) is used. Any number of phosphate-containing compounds and/or phosphate salts can be used including, but not limited to, tripolyphosphate, orthophosphate, sodium hydrogen phosphate, and sodium dihydrogen phosphate. The polyphosphate, when present, is present in the composition in the range of about 1 to 20 percent by weight of the composition.

The surfactant or surfactant package enhances mixing of the active ingredients upon contact with water or other aqueous fluid. Any suitable surfactant may be used in the compositions including, but not limited to, polymeric fatty acids, esters of fatty acids, functionalized alcohols such as alkylated or alkoxylated alcohols, alkylene oxide-containing compounds, alkyl phenol derivatives, cationic ammonium compounds, imidazoline derivatives, and phospholipids. The surfactant, when present, is present in the composition in the range of about 0.01 to 5 percent by weight of the composition.

Advantageously, the cement compositions offer an improvement over existing, oil-based rapid-setting products by exhibiting greater reactivity to more immediately provide a useful gel. The cement compositions also rapidly develop compressive strength under ambient conditions within as little as 30 minutes and develop extraordinary strength within 24 hours of mixing with water. These features provide more effective cement compositions where rapid-setting applications are desired, particularly in conformance applications where the cement compositions offer more immediate selective water shut-off and strength to support the producing formation.

In addition, cement compositions containing CAC, polyphosphate, and PC remain stable and active for at least 2 months. This is surprising because mixtures of CAC and polyphosphate with PC are not compatible when conventionally mixed.

According to several exemplary embodiments, conventional well cementing additives may be added to the cement compositions such as dispersants, defoaming agents, fluid loss additives, lost circulation additives, expansion additives, hardening accelerators, hardening retarders that may be particularly useful when high temperature environments are encountered, and lightweight additives such as gases, perlite, fly ash, silica fume, microspheres and the like.

Subterranean formations sometimes produce unwanted water from natural fractures as well as from fractures produced by forces applied deliberately or accidentally during production operations. It is known that such fractures provide a path of least resistance to the flow of fluid from a formation to a well bore. When the fluid flowing in a fracture is primarily oil, the fracture is considered to be beneficial and thus desirable; however, when the fluid flowing in the fracture from the formation to the well bore is primarily water, the fracture is considered to be a problem and thus undesirable. By using the methods described herein, an undesirable fracture that is applied deliberately or accidentally during operations can be filled with the cement compositions to plug it and thereby terminate the flow of fluid therein.

According to several exemplary embodiments, the cement compositions can be placed in a subterranean fracture as well as in a high permeability zone of the formation by the application of conventional procedures, but the cement composition itself must be rendered temporarily non-reactive by preventing contact between it and water prior in time to actual placement of the cement composition into the fracture.

After the cement composition is introduced in the fracture, water flowing in the fracture slowly contacts the cement composition to thereby render the cement reactive so as to initiate hydration, hardening and ultimate formation of a permanent plug in the fracture. By this technique the cement composition will only set when contacted by water in the fracture and thus will not set if the cement composition enters a fracture containing oil. Accordingly, oil producing portions of a reservoir will remain relatively damage free after water flow is terminated.

The methods of terminating water flow in a subterranean formation include preparing a cement composition containing CAC, PC, and a non-aqueous carrier fluid, introducing the cement composition into the subterranean formation, and contacting the cement composition with an aqueous fluid to initiate an immediate gelation of the cement composition. The cement composition takes advantage of the aggressive reaction between CAC and PC when in contact with water. The aggressive reactivity is suppressed by suspending the cements in the non-aqueous carrier fluid, and then liberated upon contact with an aqueous fluid.

According to several exemplary embodiments, the cement composition rapidly forms a viscous gel, and sets into a hardened mass with good compressive strength within a short period of time (e.g., less than about 30 minutes to 2 hours) and a high compressive strength (e.g., about 3500 psi) within 14 days at room temperature. According to several exemplary embodiments, compressive strengths of greater than 100 psi can be obtained in about 0.5 to 1 hour at room temperature, greater than 500 psi in about 24 to 48 hours at room temperature, and greater than 1000 psi in about 7 days at room temperature. These features allow the cement composition to be used in rapid-setting compositions to stop fluid losses when formed in or around a lost circulation feature, even for severe cases.

The following examples are illustrative of the compositions and methods discussed above and are not intended to be limiting.

Example 1

Compressive Strengths

A cement composition including CAC, polyphosphate, and PC is provided in Table 1 below. The CAC-polyphosphate-PC slurry was prepared by weighing out and combining solid ingredients Secar® 71 cement, SHMP, citric acid, glucono-d-lactone, and Class H PC, then mixing these ingredients with diesel in a Waring Blender at 4000 rpm. After combining all ingredients, the slurry was mixed at 4000 rpm for 1 minute. The resulting slurry was very fluid with low viscosity.

TABLE 1

| Material | Weight Percent |
| --- | --- |
| Diesel | 50.64 |
| Secar ® 71 Cement | 44.34 |
| SHMP | 2.33 |
| Citric Acid | 0.47 |
| Glucono-d-lactone | 0.24 |
| Class H PC | 1.98 |
| Total | 100.0 |

In a cylindrical curing mold, 25 g (12.5% by weight of the CAC-polyphosphate-PC slurry) of tap water was added to 200 g of the CAC-polyphosphate-PC slurry from Table 1. The mixture was stirred by hand with a stainless steel spatula, and became a very viscous gel in less than 1 minute while stirring. Stirring was ceased, the mixture was allowed to stand undisturbed at ambient temperature and pressure, and after 2 hours it was observed to have set into a hardened mass. Samples were allowed to cure for 14 days under ambient conditions, and then compressive strength was measured to give 3500 psi. Table 2 provides a summary of the cement composition and compressive strength measured after 14 days.

TABLE 2

| Material | Amount (g) | Weight Percent of Slurry | 14 Day Compressive Strength (psi)* |
| --- | --- | --- | --- |
| CAC-polyphosphate-PC Slurry | 200 | 100 | 3500 |
| Water | 25 | 12.5 | |

*Room temperature, ambient pressure

Example 2

Removal of Set Retarding Additives

Based on the stability of the slurry and its rapid reactivity when in contact with water, it was speculated whether the inclusion of set retarding additives was necessary. In order to investigate the need for set retarders in the cement composition, a similar example was prepared using the same proportions of diesel, Secar® 71 cement, SHMP, and Class H PC, but without the citric acid and glucono-d-lactone set retarders. Cement set retarders control the time when a slurry will set hard, keeping the slurry viscous and pumpable in expected wellbore temperatures and for the amount of time required to place the slurry.

Table 3 provides the formulation of this example.

TABLE 3

| Material | Weight Percent |
| --- | --- |
| Diesel | 51.01 |
| Secar ® 71 Cement | 44.66 |
| SHMP | 2.35 |
| Class H PC | 1.98 |
| Total | 100.0 |

170 g of the slurry of Table 3 was mixed with 21 g (about 12.4% by weight of the CAC-polyphosphate-PC slurry) of tap water and stirred manually with a spatula. The mixture immediately viscosified, forming a gunk material around the spatula. Samples were transferred to cylindrical curing molds and allowed to set for compressive strength measurements. It was observed that the composition had set into a hardened mass after 30 minutes of curing.

Compressive strength was measured after 30 minutes and 24 hours of curing under ambient conditions to give 243 psi and 2052 psi, respectively. Table 4 provides a summary of the cement composition and compressive strengths measured after 30 minutes and 24 hours at ambient temperature and pressure. These results indicate that the cement composition excluding set retarding additives sets very rapidly with good compressive strengths in as little as 30 minutes and provide excellent compressive strengths within 24 hours.

TABLE 4

| Material | Amount (g) | Weight Percent of Slurry | 30 Min Compressive Strength (psi)* | 24 Hr Compressive Strength (psi)* |
| --- | --- | --- | --- | --- |
| CAC-polyphosphate-PC Slurry | 170 | 100 | 243 | 2052 |
| Water | 21 | 12.4 | | |

*Room temperature, ambient pressure

Example 3

Carrier Fluid Concentration

Another example of a cement composition was prepared according to the amounts listed in Table 5. This example had a reduced amount of diesel to investigate the influence of the carrier fluid concentration on the setting reaction.

TABLE 5

| Material | Amount (g) | Weight Percent |
| --- | --- | --- |
| Diesel | 434 | 34.23 |
| Secar ® 71 Cement | 760 | 59.94 |
| SHMP | 40 | 3.15 |
| Class H PC | 34 | 2.68 |
| Total | 1268 | 100.0 |

When 127 g of the slurry of Table 5 was mixed with 16 g (about 12.5% by weight of the CAC-polyphosphate-PC slurry) of tap water and stirred manually, the mixture rapidly viscosified and became a gelled, gunk material in less than 1 minute. Samples were transferred to cylindrical curing molds and allowed to set for compressive strength measurements. It was observed that after 30 minutes under ambient conditions, the mixture had set into a hardened mass. Compressive strengths were measured after 30 minutes and 24 hours of curing under ambient conditions to give 252 psi and 3435 psi, respectively. Table 6 provides a summary of the cement composition and compressive strengths measured after 30 minutes and 24 hours at ambient temperature and pressure.

TABLE 6

| Material | Amount (g) | Weight Percent of Slurry | 30 Min Compressive Strength (psi)* | 24 Hr Compressive Strength (psi)* |
| --- | --- | --- | --- | --- |
| CAC-polyphosphate-PC Slurry | 170 | 100 | 252 | 3435 |
| Water | 21 | 12.5 | | |

*Room temperature, ambient pressure

A reduced amount of the non-aqueous carrier fluid, and increased overall concentration of the reactive components of the slurry (CAC, polyphosphate, and PC), resulted in a composition with greater compressive strength development compared with the composition of Example 2, after 24 hours of curing. Interestingly, the short-term compressive strength development, i.e., 30 minutes of curing, was comparable for Examples 2 and 3. However, the 24 hour compressive strength development was significantly greater (over 67% greater 24 hour compressive strength) for Example 3. The aggressive set behavior of this example cement composition shows great promise for conformance applications in which a water selective, rapid-setting material is desired.

Example 4

Comparison with Other Products

For comparison's sake, an existing hydrocarbon-based micro-matrix cement slurry achieves compressive strengths of 250-650 psi when cured at 180° F. for 72 hours. According to several exemplary embodiments, the cement compositions described herein may achieve this strength range under ambient conditions in approximately 30 minutes.

Another existing product, a magnesium-based settable cement composition, was prepared and compressive strength of samples were measured for further comparison. After preparation, the magnesium-based settable cement composition was mixed with 25 g of water, and the mixture stirred by hand. After 1 minute, the mixture viscosified heavily and turned into a gel. This mixture was allowed to cure in cylindrical molds, and compressive strength was measured after 24 hours at ambient temperature and pressure to give less than 50 psi. This existing material sets within 24 hours with very low compressive strength. According to several exemplary embodiments, the cement compositions described herein set more rapidly and with significantly higher compressive strengths. Table 7 provides compressive strengths measured after 24 hours for the magnesium-based settable cement composition.

TABLE 7

| Material | Amount (g) | Weight Percent Slurry | 24 Hr Compressive Strength (psi)* |
|---|---|---|---|
| Magnesium-based Slurry | 200 | 100 | <50 |
| Water | 25 | 12.5 | |

*Room temperature, ambient pressure

This data shows that the cement compositions described herein may be used for rapid-setting applications. The immediate gelling mechanism followed by a rapid set-in produces a material with high compressive strength. According to several exemplary embodiments, the cement compositions outperform existing products in reactivity and compressive strength development, and are also well suited to support well structure and isolate subterranean zones once deployed.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

What is claimed is:

1. A settable cement composition consisting essentially of:
   a calcium aluminate cement;
   a Portland cement;
   a non-aqueous carrier fluid; and
   a polyphosphate.

2. The settable cement composition of claim 1, wherein the calcium aluminate cement is present in a range of about 25 to 75 percent by weight of the composition, the Portland cement is present in a range of about 0.1 to 10 percent by weight of the composition, the non-aqueous carrier fluid is present in a range of about 25 to 75 percent by weight of the composition, or the polyphosphate is present in a range of about 1 to 20 percent by weight of the composition, or any combination thereof.

3. The settable cement composition of claim 1, wherein the non-aqueous carrier fluid comprises a hydrocarbon fluid.

4. The settable cement composition of claim 3, wherein the hydrocarbon fluid comprises diesel oil.

5. The settable cement composition of claim 1, wherein the polyphosphate is selected from sodium hexametaphosphate, tripolyphosphate, orthophosphate, sodium hydrogen phosphate, and sodium dihydrogen phosphate.

6. A cured cement composition having a compressive strength greater than about 200 psi comprising the settable cement composition of claim 1, after curing at ambient temperature and pressure for about 30 minutes.

7. A cured cement composition having a compressive strength greater than about 2000 psi comprising the settable cement composition of claim 1, after curing at ambient temperature and pressure for about 24 hours.

8. A settable cement composition consisting essentially of:
   a calcium aluminate cement;
   sodium hexametaphosphate;
   a Portland cement; and
   diesel oil.

9. The settable cement composition of claim 8, wherein the calcium aluminate cement is present in a range of about 25 to 75 percent by weight of the composition, the sodium hexametaphosphate is present in a range of about 1 to 20 percent by weight of the composition, the Portland cement is present in a range of about 0.1 to 10 percent by weight of the composition, or the diesel oil is present in a range of about 25 to 75 percent by weight of the composition, or any combination thereof.

10. A method of terminating water flow in a subterranean formation comprising:
    preparing a cement composition consisting essentially of a calcium aluminate cement, a polyphosphate, a Portland cement, and a non-aqueous carrier fluid;
    introducing the cement composition into the subterranean formation; and
    contacting the cement composition with an aqueous fluid to initiate an immediate gelation of the cement composition.

11. The method of claim 10, wherein the calcium aluminate cement is present in a range of about 25 to 75 percent by weight of the composition, the Portland cement is present in a range of about 0.1 to 10 percent by weight of the composition, the non-aqueous carrier fluid is present in a range of about 25 to 75 percent by weight of the composition, or the polyphosphate is present in a range of about 1 to 20 percent by weight of the composition, or any combination thereof.

12. The method of claim 10, further comprising curing the cement composition at ambient temperature and pressure for about 30 minutes to provide a cured cement composition having a compressive strength greater than about 200 psi.

13. The method of claim 10, further comprising curing the cement composition at ambient temperature and pressure for about 24 hours to provide a cured cement composition having a compressive strength greater than about 2000 psi.

14. A cured cement composition having a compressive strength greater than about 100 psi comprising the settable cement composition of claim 1, after curing at ambient temperature and pressure for about 30 minutes to one hour.

15. A cured cement composition having a compressive strength greater than about 500 psi comprising the settable cement composition of claim 1, after curing at ambient temperature and pressure for about 24 to 48 hours.

16. A cured cement composition having a compressive strength greater than about 1000 psi comprising the settable cement composition of claim 1, after curing at ambient temperature and pressure for about 7 days.

17. A cured cement composition having a compressive strength greater than about 200 psi comprising the settable cement composition of claim 8, after curing at ambient temperature and pressure for about 30 minutes.

18. A cured cement composition having a compressive strength greater than about 2000 psi comprising the settable cement composition of claim 8, after curing at ambient temperature and pressure for about 24 hours.

19. A cured cement composition having a compressive strength greater than about 500 psi comprising the settable cement composition of claim 8, after curing at ambient temperature and pressure for about 24 to 48 hours.

20. A cured cement composition having a compressive strength greater than about 1000 psi comprising the settable cement composition of claim 8, after curing at ambient temperature and pressure for about 7 days.

* * * * *